UNITED STATES PATENT OFFICE.

JOHN FOTTRELL, OF NEW YORK, N. Y., ASSIGNOR TO C. ROBINSON GRIGGS, SAMUEL TEBBUTT, AND ALEXANDER CURTIS, ALL OF SAME PLACE.

DISINFECTING PAVING COMPOSITION.

SPECIFICATION forming part of Letters Patent No. 446,285, dated February 10, 1891.

Application filed February 25, 1890. Serial No. 341,707. (No specimens.) Patented in England May 28, 1884, No. 8,317.

*To all whom it may concern:*

Be it known that I, JOHN FOTTRELL, of New York, in the county and State of New York, have invented a new and Improved Disinfecting Paving Composition, (for which a patent of Great Britain was issued to me May 28, 1884, No. 8,317,) of which the following is a full, clear, and exact description.

My invention is an improved disinfecting cement for application as a covering, coat, or pavement to foul, malarious, or other soils for the purpose of neutralizing and preventing noxious exhalations therefrom. To this end I employ carbolic acid as a disinfectant in connection with a body of any suitable cement.

In practice I take ordinary Portland or other suitable cement and mix with it from two to seven per cent. of carbolic acid. These proportions may be greatly varied, however, and the exact amount of disinfecting or antiseptic matter introduced will depend upon the nature of such matter and of the soil to which the cement is to be applied. The carbolic acid is thoroughly mingled with the cement and the cement is applied in the usual manner. The addition of the carbolic acid will not injure the quality of the cement.

It is well known that the paving cements ordinarily used are to a certain extent porous, and by providing them with disinfecting or antiseptic matter, as described, the action of the atmospheric air upon said matter will effectually destroy any and all disease-germs which may pass into the cement, thus rendering the surrounding air pure and wholesome. This is a very important point, as it is necessary that the atmospheric air should be admitted into the cement that it may act chemically upon the disinfecting or antiseptic matter contained therein, otherwise such matter will lie inert in the cement.

The cement must be mixed with water and applied in the usual manner.

Having thus described my invention, what I claim as new, and desire to secure by Letters Patent, is—

The herein-described composition of matter for paving, the same consisting of Portland or other cement and carbolic acid, combined in the proportions stated.

JOHN FOTTRELL.

Witnesses:
WARREN B. HUTCHINSON,
C. SEDGWICK.